July 31, 1962   A. L. VANDERGRIFF   3,046,611
APPARATUS FOR REMOVING FOREIGN MATTER FROM SEED COTTON
Filed Nov. 24, 1958   5 Sheets-Sheet 3

INVENTOR.
Arvel L. Vandergriff
BY
Jennings, Carter & Thompson
Attorneys

FIG. 8

# United States Patent Office 3,046,611
Patented July 31, 1962

3,046,611
APPARATUS FOR REMOVING FOREIGN MATTER FROM SEED COTTON
Arvel L. Vandergriff, Columbus, Ga., assignor to Lummus Cotton Gin Company, a corporation of Georgia
Filed Nov. 24, 1958, Ser. No. 775,935
13 Claims. (Cl. 19—35)

This invention relates to apparatus for removing sticks, hulls, green leaves, and other foreign material from seed cotton by separating the foreign material from the seed cotton in part through the use of centrifugal force, and more particularly to such apparatus in which resilient means are employed to press the seed cotton downwardly against a rotary saw cylinder while the foreign material is thrown off the saw cylinder by centrifugal force.

It is an object of the present invention to provide cleaning apparatus for seed cotton having a saw cylinder with a pair of resilient means angularly spaced adjacent the downgoing side of the cylinder in position to contact seed cotton carried around by the cylinder, the second resilient means being positioned out of the path of the majority of the foreign material leaving the saw cylinder adjacent the first resilient means and in the path of the majority of the seed cotton thrown off the saw cylinder.

It is a further object of the present invention to provide a housing adjacent the lower periphery of the saw cylinder with the forward edge of the housing being generally within a line of tangency drawn from the point on the periphery of the saw cylinder directly adjacent the second resilient means so that the foreign material is discharged downwardly in front of the edge of the housing while the seed cotton remains on the saw cylinder or is deflected by the housing edge onto the saw cylinder.

Heretofore, it has been common to break the sticks, hulls, and other foreign materials in the seed cotton into particles sufficiently small that they could be screened out of the cotton, or to convey the foreign matter through long reclaiming spiral picker rollers which break and grind the foreign matter. This resulted in shreds of bark and other very small particles clinging to the cotton, which particles are very difficult to remove by subsequent cleaning processes.

I have found that foreign matter thrown off a rotating saw cylinder by centrifugal force has a different trajectory from the trajectory formed by the seed cotton that is thrown off. Thus, the present invention comprises apparatus which takes advantage of this different trajectory of the foreign matter to separate the seed cotton from the foreign matter.

My apparatus comprises a pair of resilient cotton and trash engaging means angularly spaced adjacent the downgoing side of a saw cylinder in position to contact seed cotton and foreign material carried around by the saw cylinder, said resilient means having free flexible ends which bear against the seed cotton to press it against the periphery of the saw cylinder.

The above mentioned resilient means preferably comprises a pair of brushes with the second brush angularly displaced around the periphery of the saw cylinder from the first brush and adapted to engage the cotton on the saw cylinder after it has passed the first brush. The first and second brushes are adjustably mounted adjacent the saw cylinder and the second brush together with its mounting means is positioned out of the path of the majority of the foreign material leaving the saw cylinder. That is, the second brush is located generally below a line of tangency drawn from the periphery of the saw cylinder directly adjacent the first brush.

As the seed cotton and foreign material pass under the first brush, the centrifugal force of the saw cylinder "slings" or throws off from the periphery of the saw cylinder a majority of the foreign matter and seed cotton having foreign matter clinging thereto. The foreign matter, which is incompressible and of a greater density than the density of the seed cotton, is thrown over the second brush into a discharge passageway for foreign material. The cotton with a substantial amount of foreign material clinging thereto is of a less density than the foreign matter by itself, and has a different trajectory when thrown from the saw cylinder. It is also thrown over the second brush. Deflector means, such as a slide, are provided to direct the seed cotton with foreign material therein onto a second saw cylinder positioned beneath the first saw cylinder. Seed cotton having very little or no foreign material clinging thereto clings to the saw cylinder or is thrown from the saw cylinder against the second brush and deflected back against the saw cylinder to pass under the second brush. The different trajectory of the seed cotton is not due entirely to its difference in density, but is due in large part to the compressible nature of the cotton which allows the cotton to be pressed easily onto the teeth of the saw cylinder by the brushes while the foreign material, not being compressible, pushes through the bristles in the brush and leaves the saw cylinder in a line of tangency above that of the cotton. A partial housing is positioned beneath the lower periphery of the saw cylinder with the forward edge thereof preferably within a line of tangency drawn from the point on the periphery of the saw cylinder directly adjacent the second brush so that the foreign material is discharged downwardly in front of the edge of the housing while the seed cotton passes between the saw cylinder and the housing where it may be removed subsequently by doffing means.

Apparatus embodying features of my invention is shown in the accompanying drawings, forming a part of this application, in which.

Figures 1, 5, 6, 7:
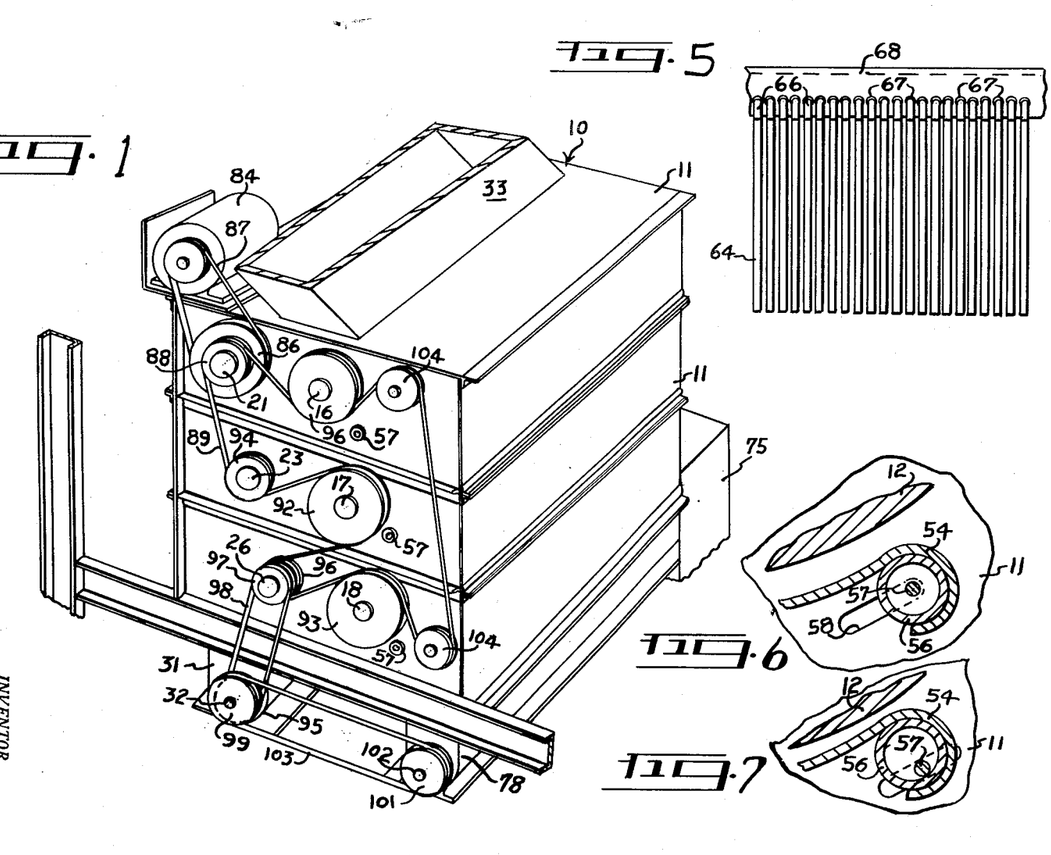
FIG. 1 is a perspective view of one embodiment of my apparatus for removing foreign matter from seed cotton and showing the drive means therefor.
FIG. 5 is a fragmentary front elevational view of trash rods disposed adjacent the saw cylinders for deflecting locks of seed cotton while allowing light foreign matter to pass between the rods.
FIG. 6 is a fragmentary sectional view of the adjusting means for adjusting the forward edge of the housing under the periphery of a saw cylinder relative to the adjacent brush.
FIG. 7 is a fragmentary sectional view of the adjusting means shown in FIG. 6 for adjusting the forward edge of the housing toward and away from a saw cylinder.
Figure 2:
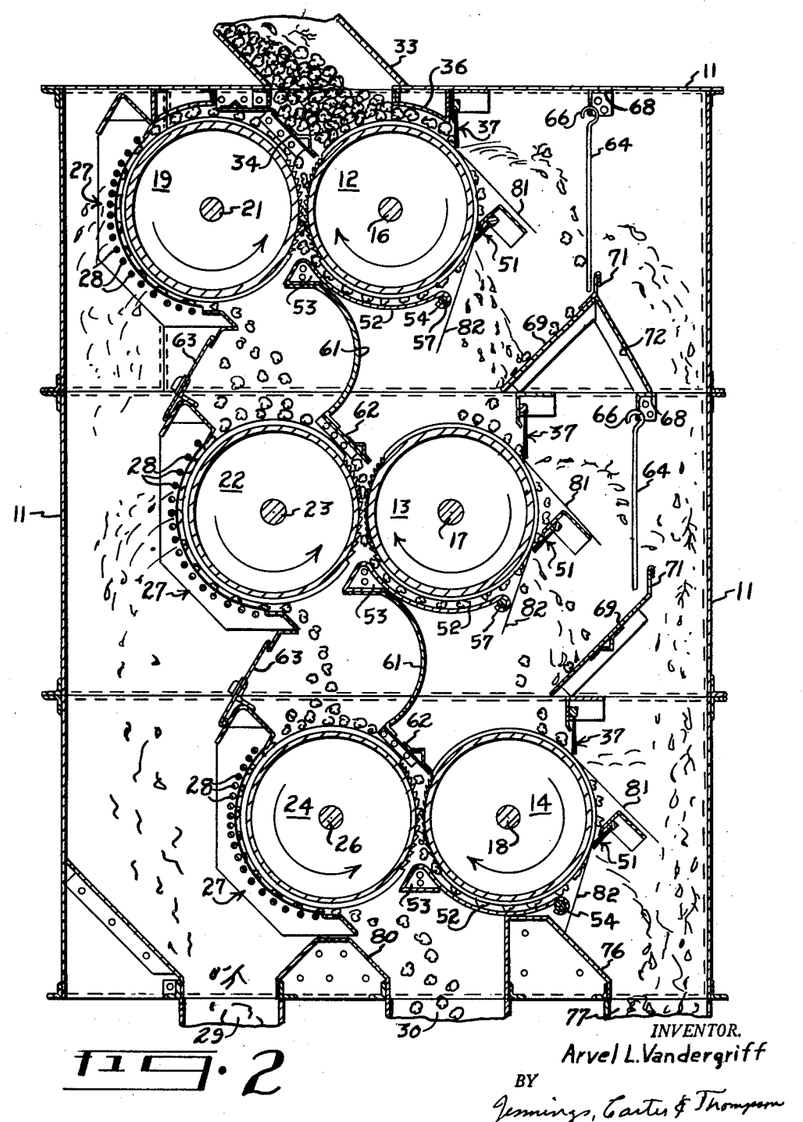
FIG. 2 is a fragmentary cross sectional view of the apparatus shown in FIG. 1 and shows the separation of the foreign matter from the seed cotton.

Referring now to the drawings, particularly FIGS. 1 and 2, I show a seed cotton cleaner indicated generally by the numeral 10 comprising a rectangular casing 11 enclosing the working elements of my apparatus and having parallel side walls connected by parallel end walls. Upper, intermediate, and lower saw cylinders 12, 13 and 14, respectively, are mounted on the side walls of casing 11 for rotation. Cylinder 12 is mounted on horizontal shaft 16 while saw cylinder 13 is mounted on a horizontal shaft 17, and saw cylinder 14 is mounted on a horizontal shaft 18, all of which extend between the side walls of casing 11. Upper doffing cylinder 19 is mounted on horizontal shaft 21 and is adapted to doff the seed cotton from the saw cylinder 12. Intermediate doffing cylinder 22 is mounted on horizontal shaft 23 and is disposed to doff cotton from intermediate saw cylinder 13. A lower doffing cylinder 24 is mounted on shaft 26 and disposed to doff cotton from saw cylinder 14.

A grid 27 is disposed adjacent each of the doffing cylinders 19, 22 and 24 and has a plurality of spaced horizontally extending rods 28 therein. Trash or foreign material in the seed cotton on the doffing rolls is discharged between the rods 28 and falls downwardly through the discharge outlet 29 where it is removed by a suitable conveyor (not shown) disposed within housing 31 and mounted on shaft 32 (see FIG. 1). The clean seed cotton does not pass between rods 28 but falls downwardly from doffing cylinder 19 onto doffing cylinder 22 and next onto doffing cylinder 24. Thus, the seed cotton is subjected to the cleaning action of doffing cylinders 22 and 24 as it passes over the grids 28 surrounding each such cylinder. A discharge passageway 30 is provided beneath doffing cylinder 24 from which the cotton is fed to other apparatus.

The seed cotton with the foreign matter therein composed of leaves, sticks, and bolls, is discharged into my cleaning apparatus 10 through the inlet 33 onto the upgoing or upper side of saw cylinder 12. A downwardly sloping inlet slide 34 is disposed adjacent the inlet 33 to guide the seed cotton and foreign material onto the upcoming side of cylinder 12. An upper partial housing 36 is disposed adjacent inlet 33 opposite slide 34 and is mounted adjacent the upper periphery of cylinder 12 to guide the cotton onto cylinder 12.

Figure 3:
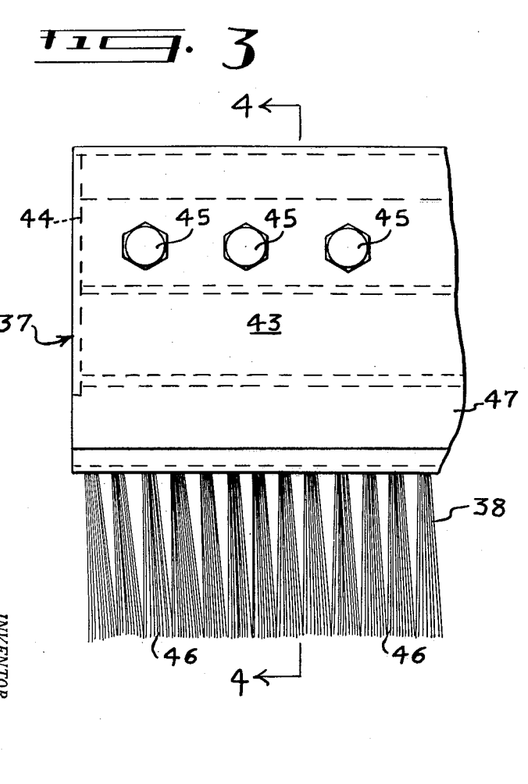
FIG. 3 is a fragmentary front elevational view of the brush and holder therefor removed from the apparatus shown in FIGS. 1 and 2.
Figure 4:
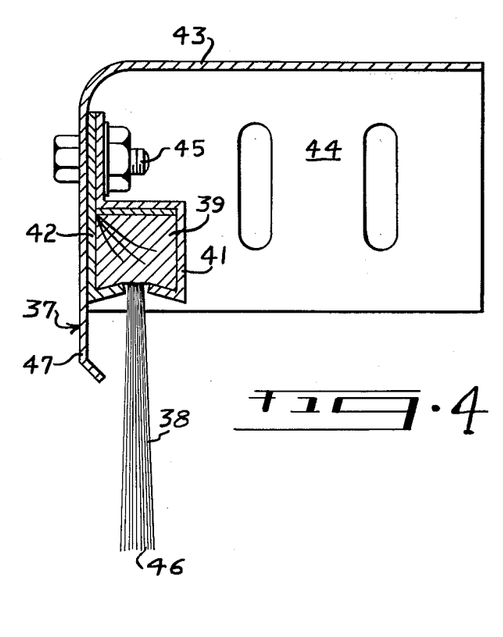
FIG. 4 is a sectional view taken along the line 4—4 of FIG. 3.

Control means to direct the seed cotton onto cylinder 12 is provided and comprises resilient means such as a wire brush 37 mounted adjacent the periphery of the saw cylinder 12 on the downgoing side thereof directly adjacent the housing 36. Referring to FIGS. 3 and 4, in which the brush 37 is shown in enlarged views, groups of wire bristles 38 are secured within a wooden holder 39. While it is understood that brushes of many types may be used in my apparatus and that my invention is not limited to a specific type of resilient means or brush, I have found that three groups of wire bristles 38 to the inch along the length of wooden holder 39 are satisfactory. Each group comprises approximately ten spring steel bristles 0.012 inch in diameter folded in half and set in a 1/8 inch diameter hole 3/8 inch deep in wooden holder 39 which is 3/4 inch by 3/4 inch. Thus, twenty bristle ends project from each of the holes in holder 39 to a distance three inches beyond the surface of holder 39 adjacent the saw cylinders. The holder 39 fits between angles 41 and 42 which are secured to an angle 43 by suitable connecting means 45. The angle plate 43 has a plate 44 at each end thereof which plate is secured to casing 11 to hold brush 37 in position adjacent the outer periphery of the saw cylinder 12. Bristles 38 have free ends 46 which are disposed closely adjacent the periphery of the saw cylinder 12 but out of actual contact with the periphery thereof. The free ends 46 press the locks of cotton onto the saw teeth of the saw cylinder 12 whereby the saws carry the seed cotton around to be removed by the doffing cylinder 19, the latter rotating oppositely and at a speed greater than saw cylinder 12, as is well known in the art.

To protect the bristles 38 from undue bending adjacent holder 39, I provide a downwardly extending deflector 47, conveniently formed as a part of angle 43. This extension deflects the foreign matter and seed cotton downwardly toward the saw cylinder 12 so that bending forces are not applied to the bristles directly adjacent the holder 39. Deflector 47 thus shields and increases the life of bristles 38.

Additional cotton control means comprises a second brush means 51 disposed adjacent the downgoing side of the saw cylinder 12 below brush means 37 and is identical to the brush 37 as shown in FIGS. 3 and 4 except for the positioning thereof.

A partial housing 52 is disposed adjacent and spaced from the lower periphery of saw cylinder 12 and is secured at its rear edge to the casing 11 at 53. The forward edge 54 (see FIGS. 6 and 7) is mounted on a tube 56 extending between the ends of casing 11. A rod 57 is disposed within the tube 56 and has its ends positioned in slots 58 disposed within side walls of casing 11 and is adapted to move therein. The ends of rod 57 are threaded and suitable nuts (not shown) may be placed thereon adjacent the slot to secure the tubing 56, as well as rod 57, in place. When it is desired to move the forward edge 54 toward and away from brush 51, it is only necessary to move the rod 57 within the slot 58. Further, if it is desired to move the forward edge 54 toward and away from the periphery of the saw cylinder 12 it is only necessary to move the tube 56 relative to the rod 57. The rod and tube are held in place by running in on the nuts, clamping the end plates of the machine against the ends of the tube.

The housings 52 for intermediate saw cylinder 13 and the lower saw cylinder 14 are identical to that for saw cylinder 12 as shown in FIGS. 6 and 7. A deflector 61 is secured to and extends downwardly from the rear edge of housings 52. An inlet slide 62 is secured to and disposed adjacent the lower end of deflectors 61 to direct the seed cotton and foreign material onto the upgoing side of saw cylinders 13 and 14. Slide 62 is identical to slide 34 adjacent saw cylinder 12. Removable panels 63 extend between grids 27 and may be removed if it is desired to inspect the cotton between the doffers 19 and 22, and 22 and 24. Thus, workmen may obtain access to the doffers.

A plurality of trash rods 64 is disposed adjacent the saw cylinders 12 and 13. As shown in FIG. 5, each of the trash rods 64 has a hook portion 66 at its upper end disposed within openings 67 in angle members 68 secured to the ends of casing 11 by suitable means. Rods 64 are closely spaced so that light foreign matter may pass between them, while locks of cotton, which are too large to pass therebetween are deflected downwardly by the rods 64. Downwardly sloping slides 69 are disposed beneath rods 64 adjacent saw cylinders 12 and 13 and have stop members 71 at the upper ends thereof adjacent the lower ends of the rods 64 to limit outward swinging movement of the rods 64. The slides 69 face the saw cylinders 12 and 13 and slope downwardly. An oppositely facing downwardly sloping slide 72 is secured to the upper end of the uppermost slide 69 and directs the foreign matter passing through the adjacent rods 64 downwardly through a discharge passageway.

A downwardly sloping slide 76 facing the discharge passageway for the foreign material is disposed beneath lower saw cylinder 14 and deflects foreign material downwardly through a discharge passageway 77. A suitable conveyor (not shown) is housed within a housing 78 (see FIG. 1) and the foreign material is discharged through the passageway 77 to the conveyor. The conveyor moves the foreign material to a suitable outlet 75.

A downwardly sloping slide 80 is disposed beneath doffing cylinder 24 and guides cotton downwardly from doffing cylinder 24 into discharge outlet 30 for the seed cotton.

As shown in FIG. 2, the brush means 51 preferably are located below the lines of tangency 81 representing the trajectories of the major portion of trash thrown off the saw cylinders. In like manner, the forward edges of the housings 52 are located below the lines of tangency 82 representing the trajectories if the majority of cotton thrown off the cylinders 12 and 13 and which contains some trash. Therefore, the trash stream from the cylinders 12 and 13 passes over the brushes without remingling with the cotton on saw cylinders, while cotton having bound therewith some of the heavier trash passes over the forward edges of the housings 52.

I utilize the fact that foreign matter which is of a greater density than the soft locks of cotton has a different trajectory than the cotton when thrown from the periphery of the saw cylinder by centrifugal force. This difference is probably due not only to the difference in density of the foreign matter, but also to the fact that the foreign matter is relatively incompressible and tends to push through the bristles in the brushes 37 and 51, thereby to be discharged at a different point about the saw cylinder than the soft locks of cotton which normally pass under the free ends of the brushes 37 and 51.

In operation, and referring to FIG. 2, seed cotton with sticks, leaves, trash, hulls, and other foreign material, is discharged in the inlet 33 and falls downwardly on the upgoing side of saw cylinder 12. Teeth on saw cylinder 12 carry the foreign material and seed cotton to the brush means 37 where centrifugal force of the saw cylinder 12 discharges a substantial amount of the foreign material outwardly to trash rods 64. The light foreign material passes between the trash rods 64 and is discharged through the passageway 77. The heavier foreign matter and the seed cotton having a substantial amount of clinging foreign matter is thrown against the rods 64 and is deflected downwardly onto slide 69 to the saw cylinder 13. The clean seed cotton and seed cotton having light foreign matter clinging thereto that is deflected by brush means 51 onto saw cylinder 12 or the seed cotton that remains onto the teeth of saw cylinder 12 passes under the brush 51. The centrifugal force of the rotating saw cylinder 12 discharges a majority of the foreign matter that passes under brush 51 in front of forward edge 54 onto saw cylinder 13. The seed cotton remaining on the teeth of the saw cylinder 12 is removed subsequently by the rotating doffer 19 which is rotating at a greater speed than saw cylinder 12. The seed cotton taken by doffer 19 is cleaned further by grids 27 and then falls downwardly onto doffers 22 and 24 to discharge passageway 30. The brush 51 is thus positioned at the point where it will catch most of the seed cotton while allowing most of the foreign material to be thrown over the uppermost portion thereof. Likewise, the forward edge 54 of the housing 52 is positioned slightly within tangent 82 so that most of the foreign matter is thrown in front of the forward edge 54 while the seed cotton is deflected onto saw cylinder 12 by the edge 54 or remains on the saw teeth of saw cylinder 12.

The seed cotton and foreign matter discharged onto saw cylinder 13 is subjected to the same process performed by the upper saw cylinder 12. Light foreign material is discharged between trash rods 64 while some of the foreign matter is deflected downwardly onto the lower saw cylinder 14 along with some of the seed cotton having foreign matter therein.

Saw cylinder 14 operates in the same manner as the intermediate saw cylinder 13 and also removes more of the foreign matter by discharging it into the discharge passageway 77 over the brush means 51 and in front of the forward edge 54 of housing 52. The doffer 22 removes the seed cotton from the saw cylinder 13 and discharges it onto doffer 24 which, in turn, removes seed cotton from saw cylinder 14 and discharges it into the passageway 29 where it is removed to a suitable collecting chamber.

For driving my apparatus (see FIG. 1), a motor 84 is positioned on the top of casing 11 and drives pulley 86 secured to shaft 21 of doffer 19 by a belt 87. A pulley 88 is also secured to shaft 21 and drives a belt 89 which in turn drives pulley 91 on shaft 16, pulley 92 on shaft 17, and pulley 93 on shaft 18. Also driven by belt 89 are pulley 94 secured to shaft 23 and pulley 96 secured to shaft 26. A pulley 97 secured to shaft 26 drives the screw conveyor through a pulley belt 98 and pulley 95 mounted on shaft 32. Pulley 99 mounted on shaft 32 drives pulley 101 mounted on shaft 102 for driving the screw conveyor mounted in housing 78. A pulley belt 103 connects the pulleys 99 and 101. Idler rollers 104 are provided to give belt 89 sufficient surface contact with the pulleys 91 and 93.

Figure 8:
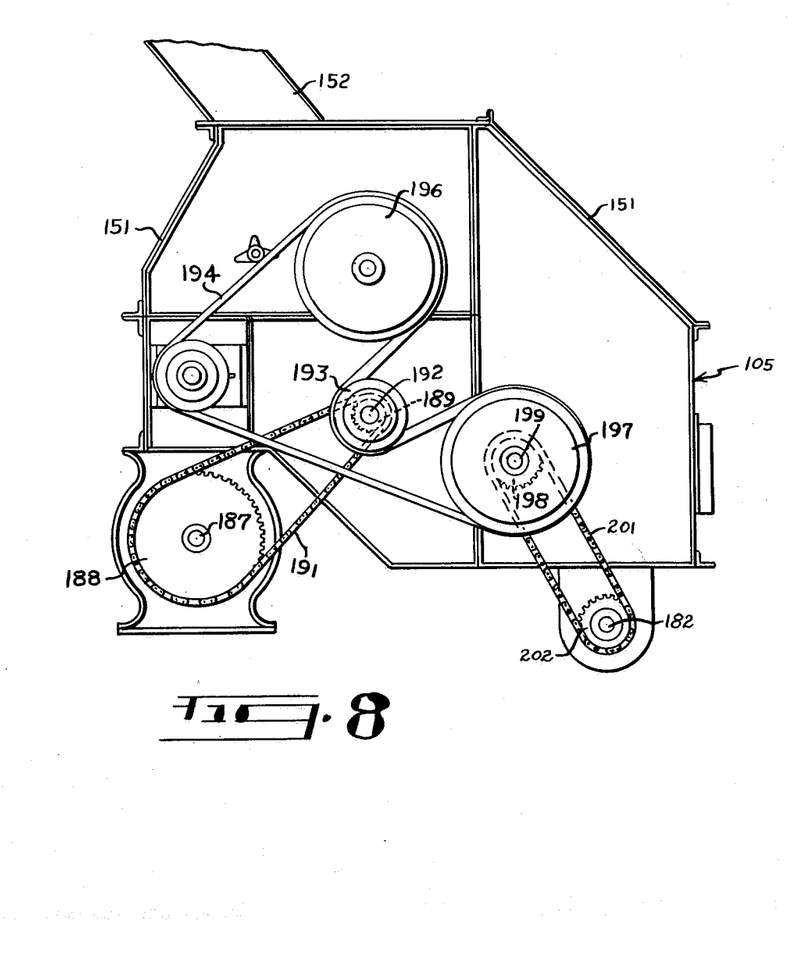
FIG. 8 is a side elevational view of a modification of my invention for removing foreign matter from seed cotton in which a pair of saw cylinders is disposed adjacent a single doffing roll; and, FIG. 9 is a cross sectional view taken through the apparatus shown in FIG. 8 and showing the means for separating the foreign matter from the seed cotton.
Figure 9:
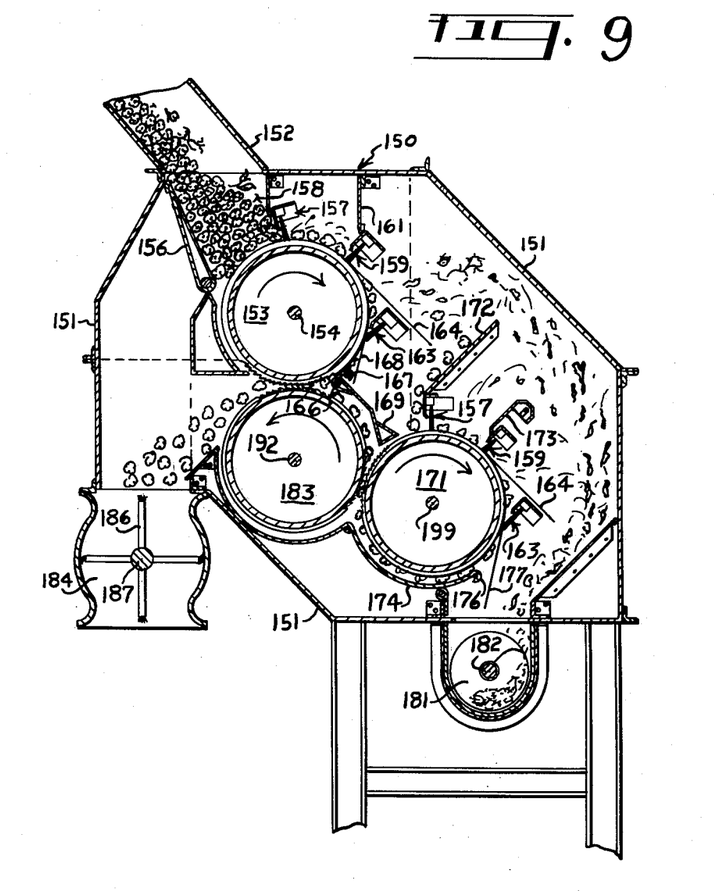

Referring now to FIGS. 8 and 9, I show a modification of my invention indicated generally by the numeral 150 and comprising a casing 151 enclosing the working elements of my apparatus. An inlet 152 is provided in the upper end of the casing 151 to receive the seed cotton with the foreign matter therein containing sticks, leaves, stalks, bolls, and other foreign material. A saw cylinder 153 is mounted on shaft 154 and the seed cotton and foreign material are discharged through inlet 152 onto the upgoing side of saw cylinder 153. A slide 156 is provided adjacent inlet 152 to guide the foreign matter and seed cotton onto the upgoing side of saw cylinder 153.

Brush means 157, substantially identical to the brush means shown in FIGS. 3 and 4 of the first described embodiment of the invention, is provided adjacent inlet 152. A deflector 158 is interposed between brush 157 and the upper end of casing 151 to guide the seed cotton and foreign material. Second brush means 159 is disposed adjacent the downgoing side of saw cylinder 153 and has a deflector 161 disposed thereover to deflect any seed cotton or foreign material thrown outwardly by centrifugal force downwardly onto the outer periphery of saw cylinder 153. A third brush means 163 is provided adjacent the downgoing side of saw cylinder 153 and the upper portion of brush means 163 is preferably positioned slightly within tangent line 164 drawn from the point on the periphery of saw cylinder 153 directly adjacent the free ends of brush means 159.

A housing 166 is disposed adjacent the lower periphery of the saw cylinder 153 and has forward edge 167 disposed slightly within a tangent 168 drawn from the point on the periphery of saw cylinder 153 directly adjacent the free ends of brushes 163. A downwardly sloping slide 169 extends downwardly from housing 166 and deflects and guides cotton and foreign material passing between brush 163 and forward edge 167 downwardly onto a second saw cylinder 171. A downwardly sloping slide 172 facing saw cylinder 153 is provided to intercept the cotton having foreign material therein thrown by centrifugal force from saw cylinder 153 between the brushes 159 and 163. Slide 172 directs the cotton and foreign material downwardly onto the upgoing side of a saw cylinder 171.

Brushes 157, 159 and 163 are disposed adjacent the downgoing side of saw cylinder 171 as in saw cylinder 153 and like reference numerals appear therefor. A downwardly sloping deflector 173 is disposed above brush means 159 adjacent saw cylinder 171 to direct cotton having foreign material thereon downwardly onto the periphery of saw cylinder 171. A housing 174 is positioned adjacent the lower periphery of saw cylinder 171 and has a forward edge 176 positioned slightly within a tangent line 177 drawn from the point on cylinder 171 directly adjacent the free ends of brush 163. The forward edge 176 is adjustable in the same manner as the forward edge 54 for the first described embodiment of the invention shown in FIGS. 6 and 7. A screw conveyor 181 is mounted on shaft 182 and receives the foreign matter discharged from the periphery of the saw cylinders 153 and 171. Screw conveyor 181 discharges the foreign material into a suitable outlet (not shown).

A doffer 183 in the form of a saw cylinder, is provided to remove the seed cotton from saw cylinders 153 and 171 and discharges the seed cotton through a discharge passageway 184 in which is mounted a drop seal feeder 186 on a shaft 187 which maintains casing 151 substantially air tight. The cotton is discharged from an outlet 184 to other apparatus.

The drive for the modified form of my apparatus is shown in FIG. 8. Shaft 187 is driven on the end thereof opposite that shown in FIG. 8 by suitable means (not shown). Drive sprocket 188 is secured to shaft 187 and drives sprocket 189 through sprocket chain 191. Sprocket 189 is mounted on shaft 192 of doffer 183. A pulley 193 is secured to shaft 192 and drives a belt 194 which drives pulleys 196 and 197 for rotating the saw cylinders 153 and 171, respectively. A sprocket 198 is fixed to shaft 199 of saw cylinder 171 and drives a sprocket chain 201 secured to sprocket 202 on shaft 182 of the screw conveyor 181. Thus, the screw conveyor 181 is rotated through sprockets 198 and 202.

The operation of the modification of my invention shown in FIGS. 8 and 9 is substantially the same as the first described embodiment of the invention. The seed cotton and foreign materials are discharged onto the upgoing side of saw cylinder 153 and pass between brush means 157 and cylinder 153 to brush means 159 where a substantial portion of the foreign material is thrown off into the discharge passageway to the screw conveyor 181. The seed cotton having foreign material thereon that is thrown off the periphery of saw cylinder 153 either contacts slide 172 or brush means 163 and thereby moves to the upgoing side of saw cylinder 171 where the process is repeated. The seed cotton is removed by the doffer 183 and discharged through discharge outlet 184 while the foreign matter which is thrown off the cylinders 153 and 171 is discharged by screw conveyor 181.

From the foregoing, it will be apparent that I have devised an improved apparatus for removing foreign matter from cotton by taking advantage of the different trajectories of the seed cotton and the foreign material. The foreign material, being of a greater density and not being compressible, tends to be thrown from the periphery of the saw cylinders at a different point from the position at which the seed cotton is thrown off. Also, since the foreign matter is of greater density, it tends to travel in a more direct line than the lighter, flufflier, locks of seed cotton and thus, the foreign matter enters the discharge passageway for foreign material. As stated, my improved apparatus takes advantage of the different trajectories of the seed cotton and foreign material by preferably positioning the second brushes or their equivalent slightly within the tangent drawn from the point on the periphery of the saw cylinder directly adjacent the free end of the first brushes. Foreign material thus is thrown over the upper portion of the second brush while the seed cotton is retained on the saw cylinder. The forward edges of the housings beneath the saw cylinders also are positioned slightly within a tangent drawn from the point on the periphery of the saw cylinder directly adjacent the second brush. A majority of the foreign material is thrown in front of the forward edge of these housings while the seed cotton either remains on the saw cylinders or is deflected by the forward edge onto the saw cylinders. It has been found that with the first described embodiment of my invention, an average of 60 percent of the light leaf trash and approximately 85 percent of the sticks, burs, and other heavy foreign matter in seed cotton is removed. My improved cleaner is particularly adapted for removing the type of foreign matter such as the stems, green leaves and sticks gathered by machine picking.

It has been common practice heretofore in gin plants with a capacity of around ten bales per hour and having five gin stands with ninety saws per stand to use an extracting unit for removing foreign matter which is fourteen feet in length or to use two extracting units ten feet in length. By the use of my apparatus, it has been found that a unit six feet in length compares favorably with the prior units in the removal of foreign matter from seed cotton. Thus, in a much smaller space, my apparatus six feet long obtains substantially the same results as does a fourteen foot unit used heretofore.

While I have shown my invention in but two forms, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In apparatus for removing hulls, sticks and other foreign material from seed cotton and having an inlet adjacent the upper end thereof, a horizontally disposed rotary main saw cylinder positioned beneath the inlet of the apparatus and receiving the main stream of the seed cotton and foreign material whereby seed cotton containing said foreign material is fed through the inlet and directly to the upper side of said main saw cylinder to be carried around thereby, first and second cotton control means fixedly mounted adjacent the downgoing side of said saw cylinder, said first and second control means being closely adjacent the periphery of the cylinder and in position to engage and direct the cotton against the periphery of the cylinder, said first and second control means being angularly spaced a sufficient distance from each other around the periphery of said saw cylinder whereby a majority of the foreign material after passing under said first control means is discharged by the centrifugal force of the rotating saw cylinder over the second control means, and a partial housing mounted in spaced relation to said saw cylinder adjacent the bottom periphery thereof and having an edge adjacent said second control means disposed generally at the line of tangency drawn from the point on the periphery of said saw cylinder directly adjacent said second control means whereby a majority of the foreign material after passing under said second control means is discharged over said housing edge.

2. In apparatus for removing hulls, sticks, leaves, and other foreign material from seed cotton and having an inlet adjacent the upper end thereof, a horizontally disposed rotary main saw cylinder positioned beneath the inlet of the apparatus and receiving the main stream of the seed cotton and foreign material whereby seed cotton containing said foreign material is fed through the inlet and directly to the upgoing side of said main saw cylinder to be carried around thereby, a brush positioned in fixed relation adjacent the downgoing side of said saw cylinder to contact the seed cotton fed thereon and to press the cotton against the saw cylinder, a second brush positioned in fixed relation adjacent the downgoing side of the saw cylinder in angularly spaced relation to said first mentioned brush to receive the seed cotton after it has passed the first brush and in position to press the cotton downwardly against the saw cylinder, a holder securing said second brush in fixed relation over said saw cylinder, the upper edge of said holder being generally at the line of tangency drawn from the point on said saw cylinder directly adjacent the first brush whereby centrifugal force from the rotation of the saw cylinder discharges a majority of the foreign material over the holder while the seed cotton remains on the saw cylinder, and means mounted adjacent the periphery of said saw cylinder beyond said second brush to doff cotton from the saw cylinder after the cotton passes the second brush.

3. Apparatus as defined in claim 2 in which a partial housing is positioned in spaced relation to said saw cylinder adjacent the bottom periphery thereof and has an edge adjacent said second brush disposed generally at the line of tangency drawn from the point on the periphery of said saw cylinder directly adjacent said second brush, whereby the centrifugal force from the rotation of the saw cylinder discharges a majority of the foreign material over said housing edge while the seed cotton remains on the saw cylinder.

4. In apparatus for separating hulls, sticks, leaves, and other foreign material from seed cotton, a casing having side and end walls, a horizontally disposed rotary saw cylinder between the side walls and adapted to receive the seed cotton and foreign material with a discharge passageway for foreign material on one side of the cylinder and a discharge passageway for seed cotton on the other side of the cylinder, means to feed seed cotton containing said foreign material to the upgoing side of said saw cylinder to be carried around thereby, a first brush mounted adjacent the downgoing side of said saw cylinder to contact the seed cotton fed thereon and to press the cotton against the saw cylinder, a second brush mounted adjacent the downgoing side of the saw cylinder and angularly spaced around the periphery of said cylinder from the first brush to receive the seed cotton after it has passed the first brush and to press the cotton against the saw cylinder, a holder securing said second brush in fixed relation adjacent said saw cylinder, the uppermost part of said holder being generally at the line of tangency drawn from the point on the periphery of said cylinder directly adjacent said first brush whereby centrifugal force from the rotation of said saw cylinder discharges a majority of the foreign material over the holder while a majority of the seed cotton remains on the saw cylinder, a downwardly inclined slide facing the downgoing side of the saw cylinder to receive cotton with foreign material thereon thrown off by centrifugal force from the saw cylinder over the holder, the upper end of the slide being spaced from an adjacent end wall to permit foreign matter to be thrown thereover, a second horizontally disposed rotary saw cylinder positioned beneath the slide to receive the cotton and foreign material therefrom and spaced from said first saw cylinder, a brush mounted adjacent said second saw cylinder adjacent the position the seed cotton is received from said slide and in position to press the cotton against the second saw cylinder, and a doffing roll positioned between the first and second saw cylinders and in closely spaced relation thereto to doff cotton from said first and second saw cylinders after a major portion of the foreign material has been removed from the cotton.

5. Apparatus defined in claim 4 in which a partial housing is positioned in spaced relation adjacent the bottom circumference of said first saw cylinder and has an edge adjacent said second brush disposed generally at the line of tangency drawn from the point on the periphery of said cylinder directly adjacent said second brush whereby centrifugal force from the rotation of the saw cylinder discharges a majority of the foreign material in front of said housing edge while the cotton remains on the saw cylinder.

6. In apparatus for removing hulls, sticks, leaves, and other foreign material from seed cotton, a horizontally disposed rotary saw cylinder adapted to receive the seed cotton and foreign material, means to feed seed cotton containing said foreign material to the upgoing side of said saw cylinder to be carried around thereby, a first brush mounted adjacent the downgoing side of said saw cylinder, a second brush mounted adjacent the downgoing side of the saw cylinder and angularly spaced about saw cylinder from said first brush, the free ends of said first and second brushes being in position to press the cotton against the periphery of the saw cylinder, a downwardly inclined slide disposed adjacent the downgoing side of the saw cylinder to receive cotton with foreign material thereon thrown off by centrifugal force from the saw cylinder between the first and second brushes, a second horizontally disposed saw cylinder positioned beneath the slide to receive the cotton and foreign matter therefrom, and a plurality of pivotally mounted horizontally spaced trash rods suspended in vertical relation over said slide and extending downwardly to the upper edge of said slide whereby cotton thrown against the rods from the first saw cylinder is deflected downwardly onto the slide therebeneath while light foreign matter passes between the rods.

7. Apparatus defined in claim 6 in which a partial housing is positioned adjacent the bottom periphery of said first saw cylinder and has an edge adjacent said second brush adjustable toward and away from said first cylinder, said edge being adjustable toward and away from said second brush.

8. In apparatus for removing hulls, sticks, leaves, and other foreign material from seed cotton, a casing having end and side walls, a horizontally disposed rotary cleaning saw cylinder between the side walls and adapted to receive the seed cotton and foreign material with a discharge passageway for foreign material on one side of the cylinder and a discharge passageway for seed cotton on the other side of the cylinder, means to feed seed cotton containing said foreign material to the upgoing side of said saw cylinder to be carried around thereby, a first brush positioned adjacent the downgoing side of said saw cylinder to contact the seed cotton fed thereon and to press the cotton against the saw cylinder, a second brush positioned adjacent the downgoing side of the saw cylinder to contact the seed cotton after it has passed the first brush and likewise in position to press the cotton against the saw cylinder, said second brush being angularly spaced from said first brush around the periphery of the saw cylinder so that a majority of the foreign matter is discharged over the second brush and a majority of the seed cotton remains on the saw cylinder, a downwardly inclined slide facing the downgoing side of the saw cylinder to receive cotton with foreign material thereon thrown off by centrifugal force from the saw cylinder between the first and second brushes, the upper end of the slide being spaced from an adjacent end wall to permit foreign matter to be thrown thereover, a second horizontally disposed rotary saw cylinder positioned beneath the slide to receive seed cotton and foreign material therefrom, first and second brushes positioned in angularly spaced relation adjacent the periphery of said second saw cylinder in position to press the cotton against said second saw cylinder, a partial housing mounted under each of said saw cylinders with the edge thereof adjacent said second brushes being generally at the tangent drawn from the point on the peripheries of the respective saw cylinders directly adjacent said second brushes whereby foreign material is discharged over the housing edges while the seed cotton remains on the saw cylinders, and rotary doffing means for removing cotton from the saw cylinders after the cotton passes the second brushes and after a majority of the foreign material has been separated therefrom.

9. Cleaning apparatus defined in claim 8 in which a plurality of pivotally mounted horizontally spaced trash rods is suspended in vertical relation adjacent said slide, said rods being spaced a sufficient distance so that cotton thrown against the rods from the first saw cylinder is deflected downwardly onto the slide therebeneath without passing between the rods.

10. In apparatus for removing foreign material from seed cotton, a casing having end and side walls, an inlet adjacent the upper end of the casing, a horizontally disposed rotary main upper saw cylinder positioned between the side walls beneath the inlet of the apparatus and receiving the main stream of cotton and foreign material from the inlet, means to feed seed cotton containing said foreign material through the inlet directly to the upper side of the upper saw cylinder to be carried around thereby, a stationary brush fixedly mounted adjacent the inlet on the downgoing side of the saw cylinder and receiving said main stream to press the seed cotton against the periphery of the saw cylinder, a downwardly inclined slide facing the downgoing side of the upper saw cylinder and having its upper end spaced from an end wall to define a passageway therebetween for foreign matter, a lower horizontally disposed rotary saw cylinder between the side walls and beneath the lower end of the inclined slide, said upper saw cylinder rotating at a sufficient speed to sling off a majority of the foreign matter and seed cotton clinging thereto with the heavier foreign matter going over the upper end of the slide into the foreign matter passageway and the lighter foreign matter with the cotton clinging thereto contacting the slide and moving downwardly into the lower saw cylinder, a stationary brush fixedly mounted adjacent the downgoing side of the lower saw cylinder to press the seed cotton against the periphery of the saw cylinder, said lower cylinder rotating at a sufficient speed to sling off a majority of the trash into the adjacent foreign matter passageway while a majority of the seed cotton remains on the lower saw cylinder, and means to doff cotton from the upper and lower saw cylinders.

11. In apparatus for removing foreign matter from seed cotton, a casing having end and side walls, an inlet adjacent the upper end of the casing, upper and lower rotating saw cylinders positioned between the side walls with a passageway for foreign matter on one side of the cylinders and a passageway for seed cotton on the other side of the cylinders, said upper saw cylinder being beneath the inlet of the apparatus and receiving the main stream of cotton and foreign material from the inlet, means to feed seed cotton containing said foreign material through the inlet directly to the upper side of the upper saw cylinder to be carried around thereby, a stationary brush fixedly mounted adjacent the downgoing side of said upper and lower saw cylinder to press the seed cotton against the periphery of the cylinders, a downwardly inclined slide facing the downgoing side of the upper saw cylinder and having its upper end spaced from an end wall to permit foreign matter to be thrown thereover into a foreign matter passageway adjacent said end wall, said cylinders rotating at a speed sufficient to sling off a majority of the foreign matter and seed cotton clinging thereto with the heavier foreign matter from the upper cylinder going over the slide into the foreign matter passageway while the lighter foreign matter is caught by the slide and directed onto the lower saw cylinder positioned beneath the lower end of the slide, means angularly spaced from the brushes to direct the seed cotton against the upper and lower saw cylinders after the cotton passes under the brushes, and means to doff the cotton from the saw cylinders and direct it to the discharge passageway for seed cotton.

12. In apparatus for removing foreign matter from seed cotton, a casing having end and side walls, an inlet adjacent the upper end of the casing, upper and lower rotating saw cylinders positioned between the side walls with a passageway for foreign matter on one side of the cylinders and a passageway for seed cotton on the other side of the cylinders, said upper saw cylinder being beneath the inlet of the apparatus and receiving the main stream of cotton and foreign material from the inlet, means to feed seed cotton containing said foreign material through the inlet directly to the upper side of the upper saw cylinder to be carried around thereby, cotton control means fixedly mounted adjacent the downgoing side of said upper and lower saw cylinders to press the seed cotton against the periphery of the cylinders, a downwardly inclined slide facing the downgoing side of the upper saw cylinder and having its upper end spaced from an end wall to permit foreign matter to be thrown thereover into a foreign matter passageway adjacent said end wall, said cylinders rotating at a speed sufficient to sling off a majority of the foreign matter and seed cotton clinging thereto with the heavier foreign matter from the upper cylinder going over the slide into the foreign matter passageway while the lighter foreign matter is caught by the slide and directed onto the lower saw cylinder positioned beneath the lower end of the slide, additional cotton control means angularly spaced from said first mentioned cotton control means on each of said cylinders to engage and direct the seed cotton against the upper and lower saw cylinders after the cotton passes under the first mentioned cotton control means, and means to doff the cotton from the saw cylinders and direct it to the discharge passageway for seed cotton.

13. In apparatus for removing foreign material from seed cotton, a casing having end and side walls, an inlet adjacent the upper end of the casing, a horizontally disposed rotary main upper saw cylinder positioned between the side walls beneath the inlet of the apparatus, said upper saw cylinder receiving the main stream of cotton and foreign material from the inlet on the upper side thereof to be carried around thereby, cotton control means mounted adjacent the downgoing side of the saw cylinder to press the seed cotton against the periphery of the saw cylinder, a downwardly inclined slide facing the downgoing side of the upper saw cylinder, a lower horizontally disposed rotary saw cylinder between the side walls and adjacent the lower end of the inclined slide, said upper saw cylinder rotating at a speed sufficient to sling off a majority of the seed cotton having heavy foreign matter clinging thereto whereby cotton with foreign matter clinging thereto is thrown onto the slide and thence is delivered to the lower saw cylinder, cotton control means mounted adjacent the downgoing side of the lower saw cylinder to press the seed cotton delivered by the slide against the periphery of said lower saw cylinder, said lower saw cylinder rotating at a speed sufficient to sling off the trash delivered by the slide while the seed cotton delivered thereby remains on the lower saw cylinder, and means to doff cotton from the upper and lower saw cylinders.

References Cited in the file of this patent
UNITED STATES PATENTS

| | | |
|---|---|---|
| 1,613,242 | Mitchell | Jan. 4, 1927 |
| 1,656,398 | Smith | Jan. 17, 1928 |
| 1,751,305 | Cumpston | Mar. 18, 1930 |
| 1,802,615 | O. Mitchell | Apr. 28, 1931 |
| 2,100,301 | Mitchell | Nov. 23, 1937 |
| 2,123,405 | Court | July 12, 1938 |